US011829283B2

(12) United States Patent
Chilupuri et al.

(10) Patent No.: US 11,829,283 B2
(45) Date of Patent: Nov. 28, 2023

(54) REST API VALIDATION

(71) Applicant: Oracle International Corporation, Redwood Shores, CA (US)

(72) Inventors: Kavya Chilupuri, Hyderabad (IN); David M. Clifton, Ellicott City, MD (US); Dharmalingam Ganesan, Crofton, MD (US)

(73) Assignee: Oracle International Corporation, Redwood Shores, CA (US)

( * ) Notice: Subject to any disclaimer, the term of this patent is extended or adjusted under 35 U.S.C. 154(b) by 111 days.

(21) Appl. No.: 17/389,507

(22) Filed: Jul. 30, 2021

(65) Prior Publication Data

US 2023/0047837 A1    Feb. 16, 2023

(51) Int. Cl.
*G06F 11/36* (2006.01)
*G06F 9/54* (2006.01)
*G06F 16/955* (2019.01)
*G06F 40/18* (2020.01)

(52) U.S. Cl.
CPC .......... *G06F 11/3684* (2013.01); *G06F 9/547* (2013.01); *G06F 11/3688* (2013.01); *G06F 11/3692* (2013.01); *G06F 16/9566* (2019.01); *G06F 11/3616* (2013.01); *G06F 11/3696* (2013.01); *G06F 16/9558* (2019.01); *G06F 40/18* (2020.01)

(58) Field of Classification Search
CPC ............. G06F 11/3684; G06F 11/3688; G06F 11/3692; G06F 11/3616; G06F 11/3696; G06F 16/9566; G06F 16/9558; G06F 9/547; G06F 40/18
See application file for complete search history.

(56) References Cited

U.S. PATENT DOCUMENTS

| 8,745,641 | B1 | 6/2014 | Coker | |
| 9,419,884 | B1 * | 8/2016 | Li | H04L 43/50 |
| 10,437,712 | B1 * | 10/2019 | Tyler | G06F 11/3684 |
| 10,740,215 | B2 | 8/2020 | Lowe et al. | |

(Continued)

OTHER PUBLICATIONS

Andy Neumann et al., An Analysis of Public REST Web Service APIs, 2021, [Retrieved on Aug. 21, 2023]. Retrieved from the internet: <URL: https://ieeexplore.ieee.org/stamp/stamp.jsp?tp=&arnumber=8385157> 14 Pages (957-970) (Year: 2021).*

*Primary Examiner* — Anibal Rivera
(74) *Attorney, Agent, or Firm* — Potomac Law Group, PLLC

(57) ABSTRACT

Embodiments validate representational state transfer ("REST") application program interfaces ("API"). Embodiments receive a REST API specification that provides information for a plurality of REST APIs and parse the REST API specification to extract, for each REST API, a corresponding Uniform Resource Locator ("URL"), and corresponding parameter names response codes and payloads. Embodiments convert the parsed REST API specification into a converted text file, the converting including parameter constraints and parameter default values. Embodiments then generate all possible combinations of test data for each REST API from the converted text file and perform one or more test operations on each of the combinations of test data.

20 Claims, 11 Drawing Sheets

(56) References Cited

U.S. PATENT DOCUMENTS

| | | | |
|---|---|---|---|
| 2016/0147578 A1* | 5/2016 | Biesack | H04L 67/02 |
| | | | 719/328 |
| 2018/0314622 A1* | 11/2018 | Lowe | G06F 11/3616 |
| 2018/0357154 A1* | 12/2018 | Dolby | G06F 11/3664 |
| 2020/0233787 A1* | 7/2020 | Battaglia | H04L 63/0876 |
| 2020/0326913 A1* | 10/2020 | Ying | G06F 9/54 |
| 2021/0240600 A1* | 8/2021 | Larosa | G06F 11/3664 |
| 2021/0334384 A1* | 10/2021 | Ranjan | G06F 11/3636 |
| 2022/0121562 A1* | 4/2022 | Kumar | G06F 11/3696 |

* cited by examiner

Fig. 4

| | URL | OPERATI( | Paramete | Paramete | Paramete | Paramete | Paramete | Parameter Schema | Response_code | Scope |
|---|---|---|---|---|---|---|---|---|---|---|
| 1 | | | | | | | | | | |
| 2 | /hskpd/Hotels/{hotelid}/housekeepingOvr | get | hotelid | path | True | string | | | %200,204,400,403,404,405,406,413,414,415,500,502 | Yes |
| 3 | | | limit | query | False | integer | | | | |
| 4 | | | offset | query | False | integer | | | | |
| 5 | | | houseke | query | False | array | | | | |
| 6 | | | frontOffi | query | False | array | | | | |
| 7 | | | turndow | query | False | array | | | | |
| 8 | | | roomPart | query | False | array | | | | |
| 9 | | | serviceR | query | False | array | | | | |
| 10 | | | roomAtt | query | False | array | | | | |
| 11 | | | techHrs | query | False | array | | | | |
| 12 | | | fromRoo | query | False | string | | | | |
| 13 | | | toRoom# | query | False | string | | | | |
| 14 | | | floor_ | query | False | array | | | | |
| 15 | | | roomTyp | query | False | array | | | | |
| 16 | | | roomClas | query | False | array | | | | |
| 17 | | | building | query | False | array | | | | |
| 18 | | | roomFea | query | False | array | | | | |
| 19 | | | dayofchk | query | False | array | | | | |
| 20 | | | eveningi | query | False | array | | | | |
| 21 | | | reservati | query | False | array | | | | |
| 22 | | | guestSer | query | False | string | | | | |
| 23 | | | roomidT( | query | False | string | | | | |
| 24 | | | | | False | string | | | | |
| 25 | | | authoriza | header | True | string | | | | |
| 26 | | | x-app-ke | header | True | string | | | | |
| 27 | /hskp/v1/Hotels/{hotelid}/rooms/status | post | hotelid | path | True | string | | {"roomList": [ {"roomId": "0118"}, {"roomId": "082"}, ], "housekeepingRoom status": "Dirty"} | 200,400,401,403,404,405,406,413,414,415,500,502,503 | yes |
| 28 | | | houseke | body | True | string | | | | |
| 29 | | | authoriza | header | True | string | | | | |
| 30 | | | x-app-ke | header | True | string | | | | |

```
C:\Windows\System32\cmd.exe
Microsoft Windows [Version 10.0.19042.1052]
(c) Microsoft Corporation. All rights reserved.

D:\Personal\Demo>python swagger_excel_cmd.py hsk.yaml constraints.txt default.txt
/hsk/v1
/hsk/v1/hotels/{hotelId}/housekeepingOverview
get
1
Entering parameters loop
You are inside parameters loop
{'name': 'hotelId', 'in': 'path', 'required': True, 'type': 'string', 'pattern': '^[A-Za-z0-9_%#$&-]*$', 'min
Length': 1, 'maxLength': 200, 'description': 'Hotel Code for which Housekeeping overview needs to be fetched
'}
{'name': 'limit', 'in': 'query', 'required': False, 'description': 'Indicates maximum number of records a Web
 service should return.', 'type': 'integer'}
{'name': 'offset', 'in': 'query', 'required': False, 'default': 0, 'required': False, 'description': 'Index or initial index of 1
he set(page) being requested. If the index goes out of the bounds of the total set count then no data will be
 returned.', 'type': 'integer'}
{'name': 'housekeepingRoomStatus', 'in': 'query', 'type': 'array', 'collectionFormat': 'multi', 'description'
```

```
D:\Personal\Demo>python report_final.py hsk.xls https://wfivm04329.us.oracle.com/operarest/vab report_name rep
orts/default_txt testmandatory=false regression=false large.json
regression check is false
mandatory_check is false
get ['get']
parameters to be checked = ['delete', 'post', 'put', 'options']
['limit', 'offset', 'housekeepingRoomStatus', 'frontOfficeRoomStatus', 'turndownStatus', 'roomParityStatus',
'serviceRequestStatus', 'roomAssignmentStatus', 'fetchInstructions', 'fromRoomNumber', 'toRoomNumber', 'floor',
'roomType', 'roomClass', 'building', 'roomFeatures', 'daySection', 'eveningSection', 'reservationStatus', 'gu
estServiceRequest', 'roomIdText']
['authorization', 'x-app-key']
['hotelId']
[]
https://wfivm04329.us.oracle.com/operarest/vab/hsk/v1/hotels/{hotelId}/housekeepingOverview
hsk.vhotels{hotelId}housekeepingOverview-get.xls
values start from 6 th row
not updated
test case no : 1
path paramater = {'hotelId': 'SK003'}
```

```
D:\Personal\Demo>python report_final.py hsk.xls https://wfivm04329.us.oracle.com/operarest/vab report_name reports/default.txt testmandatory=true regression=false large.json
regression check is false
mandatory_check is true
go to the mandatory script
mandatory parameters = ['hotelId', 'authorization', 'x-app-key']
nonmandatory parameters= ['limit', 'offset', 'housekeepingRoomStatus', 'frontOfficeRoomStatus', 'turndownStatus', 'roomParityStatus', 'serviceRequestStatus', 'roomAssignmentStatus', 'fetchInstructions', 'fromRoomNumber', 'toRoomNumber', 'floor', 'roomType', 'roomClass', 'building', 'roomFeatures', 'daySection', 'eveningSection', 'reservationStatus', 'guestServiceRequest', 'roomIdText']
['limit', 'offset', 'housekeepingRoomStatus', 'frontOfficeRoomStatus', 'turndownStatus', 'roomParityStatus', 'serviceRequestStatus', 'roomAssignmentStatus', 'fetchInstructions', 'fromRoomNumber', 'toRoomNumber', 'floor', 'roomType', 'roomClass', 'building', 'roomFeatures', 'daySection', 'eveningSection', 'reservationStatus', 'guestServiceRequest', 'roomIdText']
['authorization', 'x-app-key']
['hotelId']
[]
https://wfivm04329.us.oracle.com/operarest/vab/hsk/v1/hotels/{hotelId}/housekeepingOverview
```

Fig. 10

REST API VALIDATION

FIELD

One embodiment is directed generally to a computer system and services, and in particular to web services and validating interfaces to the web services.

BACKGROUND INFORMATION

Representational state transfer ("REST") is a software architectural style that was created to guide the design and development of the architecture for the World Wide Web. REST defines a set of constraints for how the architecture of an Internet-scale distributed hypermedia system, such as the Web, should behave. The REST architectural style emphasizes the scalability of interactions between components, uniform interfaces, independent deployment of components, and the creation of a layered architecture to facilitate caching components to reduce user-perceived latency, enforce security, and encapsulate legacy systems. REST has been employed throughout the software industry and is a widely accepted set of guidelines for creating stateless, reliable web services.

Any web service that obeys the REST constraints can be referred to as "RESTful." Such a web service must provide its Web resources in a textual representation and allow them to be read and modified with a stateless protocol and a predefined set of operations. This approach allows the greatest interoperability between clients and servers in a long-lived Internet-scale environment which crosses organizational trust boundaries.

In a RESTful Web service, requests made to a resource's Uniform Resource Identifier ("URI") or Uniform Resource Locator ("URL") elicit a response with a payload formatted in HyperText Markup Language ("HTML"), Extensible Markup Language ("XML"), JavaScript Object Notation ("JSON"), or some other format. For example, the response can confirm that the resource state has been changed. The response can also include hypertext links to related resources. The most common protocol for these requests and responses is Hypertext Transfer Protocol ("HTTP"). HTTP provides operations (i.e., HTTP methods) such as GET, POST, PUT, and DELETE. By using a stateless protocol and standard operations, RESTful systems aim for fast performance, reliability, and the ability to grow by reusing components that can be managed and updated without affecting the system as a whole, even while it is running.

SUMMARY

Embodiments validate representational state transfer ("REST") application program interfaces ("API"). Embodiments receive a REST API specification that provides information for a plurality of REST APIs and parse the REST API specification to extract, for each REST API, a corresponding Uniform Resource Locator ("URL"), and corresponding parameter names response codes and payloads. Embodiments convert the parsed REST API specification into a converted text file, the converting including parameter constraints and parameter default values. Embodiments then generate all possible combinations of test data for each REST API from the converted text file and perform one or more test operations on each of the combinations of test data.

BRIEF DESCRIPTION OF THE DRAWINGS

Figure 4:
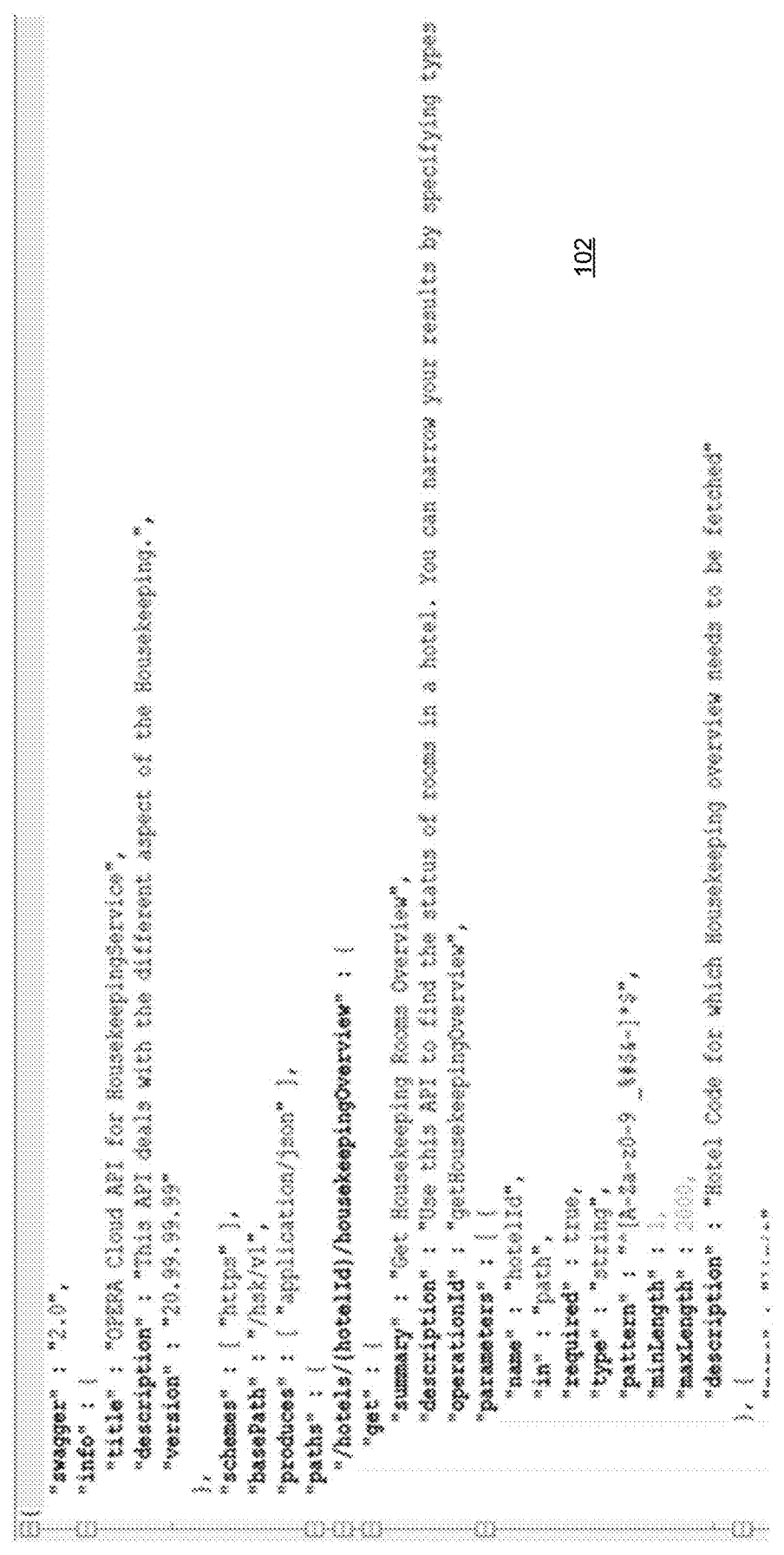

FIG. 4 illustrates an example REST API specification in accordance to one embodiment.

FIG. 5 illustrates a partial example of a spreadsheet file in accordance to one embodiment.

FIG. 6 is a partial screenshot illustrating how the initial code is executed by the combination generation tool and how the swagger is converted into an excel file and in turn generates test data combinations in accordance to embodiments.

FIG. 7 is an example partial spreadsheet output by the combination generator with the data combinations in accordance to embodiments.

FIG. 8 is a partial screenshot that illustrates the analyzer executing testing and generating test reports in accordance to embodiments.

FIG. 9 illustrates an example of an HTML report in accordance to one embodiment.

FIG. 10 is a partial screenshot that illustrates how the embodiments can be run to check mandatory fields and to perform regression testing on the Application Under Test ("AUT") and generate test reports in accordance to embodiments.

DETAILED DESCRIPTION

One embodiment is a representational state transfer ("REST") application program interfaces ("API") validator that validates REST APIs in connection with a REST API specification. Given one or more REST APIs, embodiments certify that each REST API satisfies the required REST API standard/specification. Embodiments automatically generate test inputs from the REST API specification and conduct both security and functional testing for each of the REST APIs.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

Figure 1:
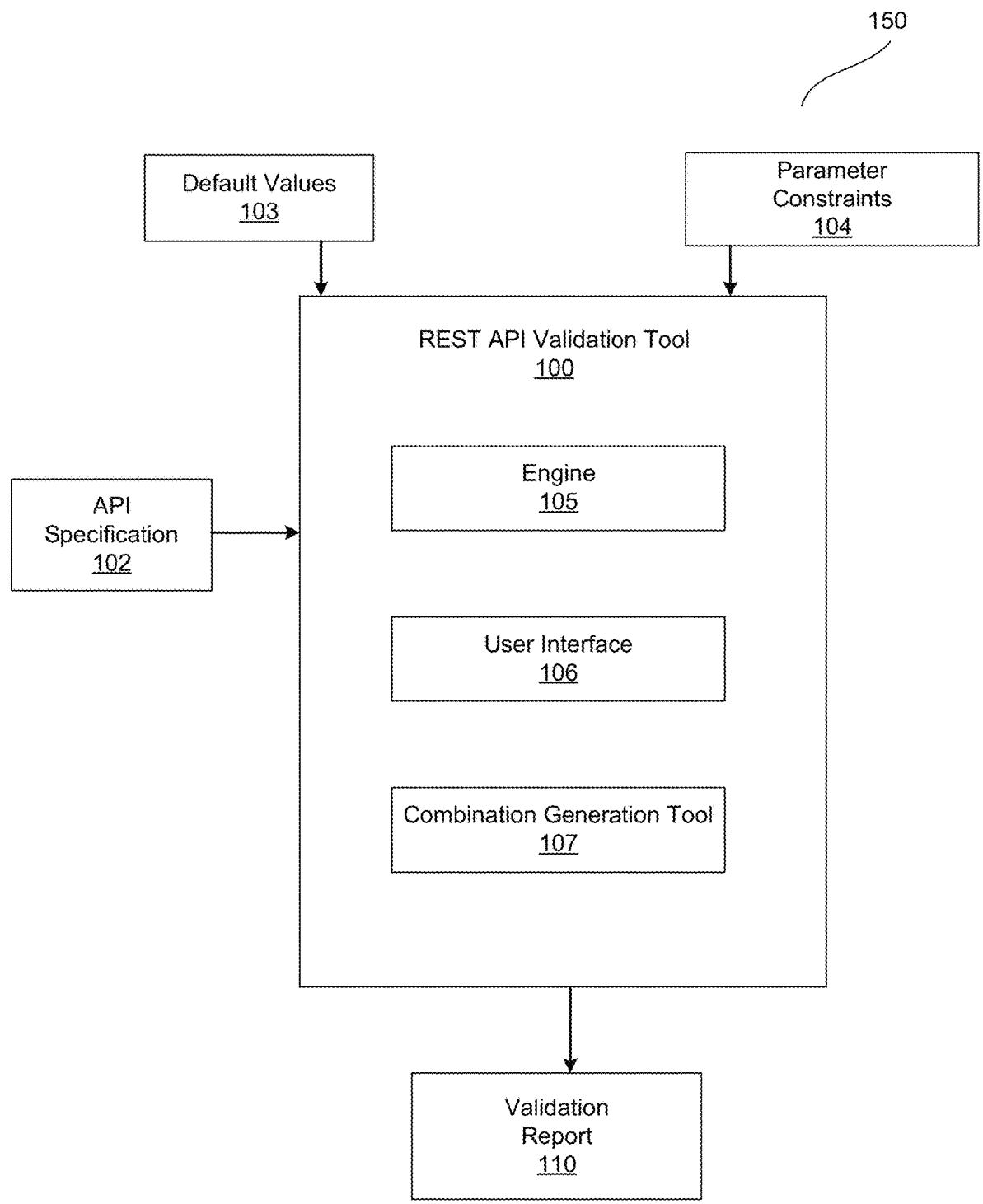
FIG. 1 is a block diagram of a REST API validation system in accordance to embodiments of the invention.

FIG. 1 is a block diagram of a REST API validation system 150 in accordance to embodiments of the invention. In general, system 150 includes a validation tool 100 that provides an end-to-end environment for systematically conducting both security and functional testing of REST APIs. Embodiments check whether the given REST API is conformant to REST standards. Embodiments automatically extract parameters from a REST API specification and utilizes combinatorial testing algorithms to generate test vectors. Further, embodiments run the generated tests and check against the expected behavior specified by the user. Embodiments include default testing that can automatically check the Hypertext Transfer Protocol ("HTTP") return code of the response payload from the REST API implementation.

System 150 includes a REST API validation tool 100 that includes a REST API validation engine 105, a user interface 106, and a combination generation tool 107. Engine 105 performs the REST API validation, and includes a converter to generate a text file, one or more parsers for performing two different parsings, and an analyzer for performing analysis. User interface 106 provides a user interface ("UI") to allow a user to input default values 103 and parameter constraints 104, and to output a validation report 110.

Validation tool 100 further receives as input one or more REST API specifications 102. REST is an architectural style, not a strict standard. Therefore, it allows for flexibility among programmers of varying levels of experience. Implementations include API standards that are used to enforce good practice (e.g., well documented APIs, backward versions with upgrade windows, appropriate use of HTTP verbs, etc.) as well as enforce consistency. For multiple APIs, the experience across the APIs should be similar and therefore components may be reused.

API specifications may include definitions and a set of rules for a format describing REST APIs. The format is both machine-readable and human-readable, and used to share documentation among product managers, testers and developers. It may also be used with various tools to automate API-related processes. API specifications may define a standard, language-agnostic interface to REST APIs which allows both humans and computers to discover and understand the capabilities of the service without access to source code, documentation, or through inspection.

In embodiments, API specification 102 may include a specification for machine-readable interface files for describing, producing, consuming, and visualizing RESTful web services. A variety of tools may generate code, documentation and test cases given an interface file. Development of the OpenAPI Specification ("OAS") is overseen by the Open API Initiative, an open source collaborative project of the Linux Foundation. According to an embodiment of the present invention, APIs have a specification, which may include an Open API Specification or Swagger contract. In embodiments, API specification 102 is implemented using the Swagger (JSON/YAML) format or the API Blueprint format.

Figure 2:
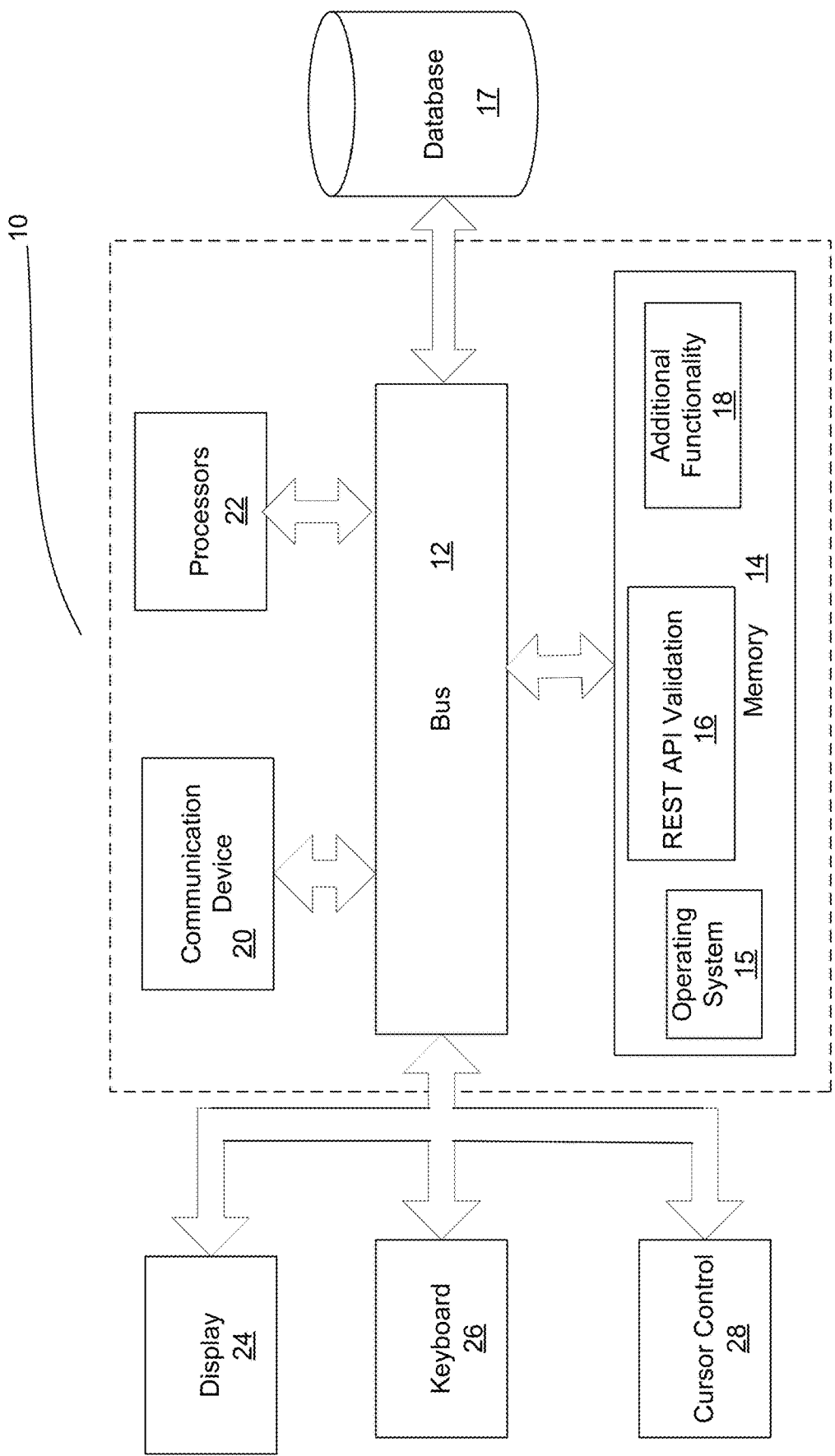
FIG. 2 is a block diagram of one or more components of the system of FIG. 1 in the form of a computer server/system in accordance with an embodiment of the present invention.

FIG. 2 is a block diagram of one or more components of system 150 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. System 10 can be used to implement any of the components/elements shown in FIG. 1 and/or interact with any of the components.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD") and includes a microphone for receiving user utterances. A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further includes a REST API validation module 16 that validates REST APIs against a REST API specification, and all other functionality disclosed herein. System 10 can be part of a larger system. Therefore, system 10 can include one or more additional functional modules 18 to include the additional functionality. A file storage device or database 17 is coupled to bus 12 to provide centralized storage for modules 16 and 18. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based system, a software-as-a-service ("SaaS") architecture, or other type of computing solution.

As disclosed, one embodiment is a tool that tests/validates REST APIs. Embodiments retrieve the information directly from the API documentation (i.e., REST API specifications), and generates test data automatically with varied combinations of data generated from combinations generator 107. Embodiments also incorporate automatic and more generic assertions to validate the execution of the APIs and generate reports. Embodiments further check for HTTP headers, unsupported verbs, incorrect URLs, etc.

Embodiments retrieve all of the paths mentioned in the REST API specification, along with the parameter details and response codes to generate a more easily understandable spreadsheet or "Excel" file (or any other type of human readable file). Based on the parameter type and the nature of the parameter, randomization of the test data is done. This test data is fed into combination generator tool 107 to generate test data combinations which help in identifying corner cases (i.e., cases outside of normally expected results).

The APIs are then tested based on the operation type and varied test data combinations to generate HTML reports (or other similarly formatted reports) based on generic assertions. The test data retrieved from a GET operation is stored and used for the upcoming test activities and the results are compared with the previous executions to check the stability of the system.

Figure 3:
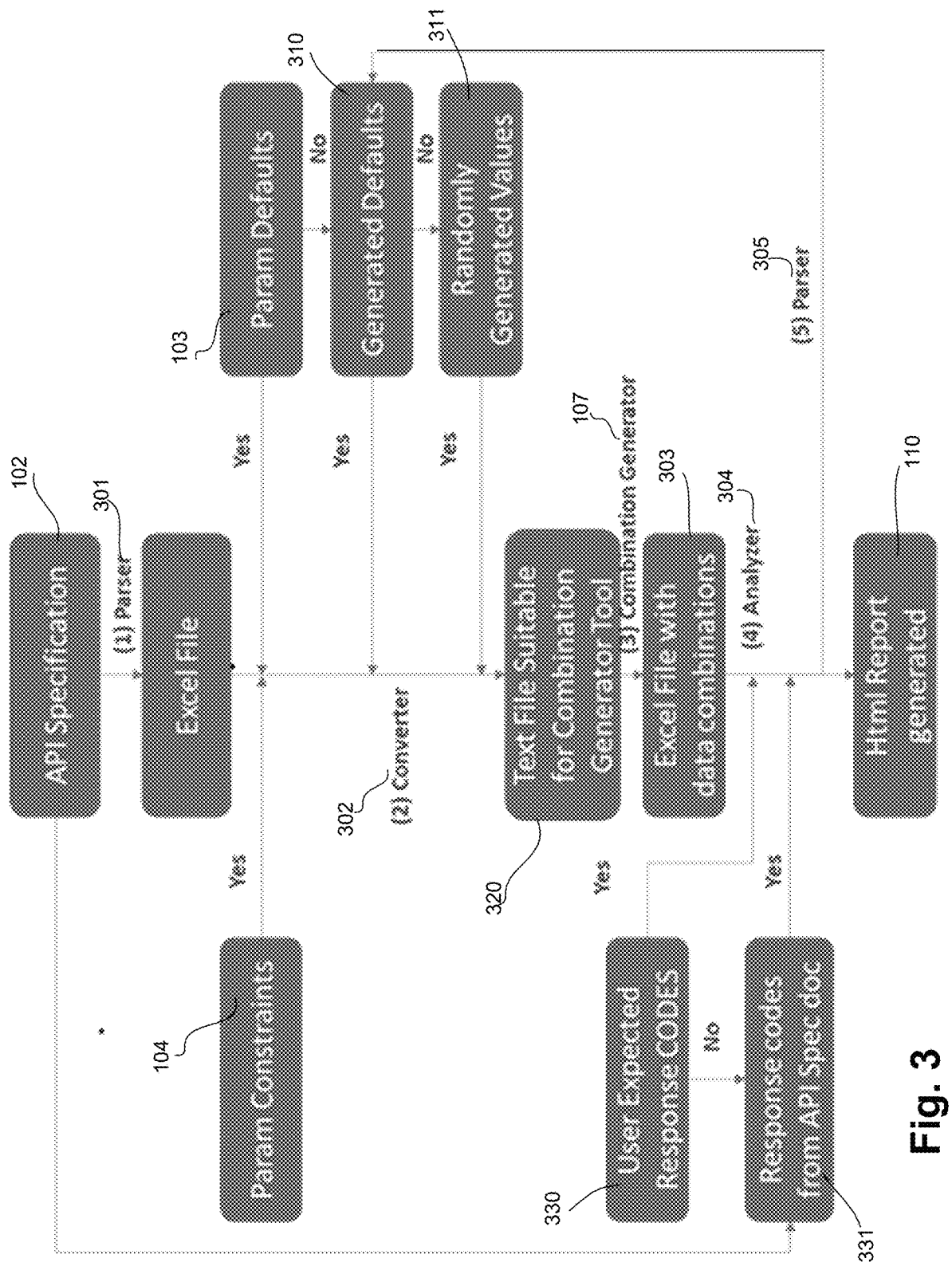
FIG. 3 is a flow diagram of the functionality of the REST API Validation module of FIG. 1 for validating REST APIs services in accordance with one embodiment.

FIG. 3 is a flow diagram of the functionality of REST API Validation module 16 of FIG. 2 for validating REST APIs services in accordance with one embodiment. In one embodiment, the functionality of the flow diagram of FIG. 3 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 301, REST API specification 102 is parsed using a parser to extract the resource URL, the parameter names along with the parameter information, the response codes and the JSON payload for POST and PUT operations. This parsed information is provided and generated as an Excel file or any spreadsheet or other user readable format. The resource URL is the resource path, which is the URL prefix for all API paths relative to the host root. An example REST endpoint is as follows:

https://wfivm04329.us.oracle.com/operarest/vab/hsk/v1/hotels/{hotelId}/housekeepingOverview
https: Scheme
wfivm04329.us.oracle.com: API Host Server
operarest/vab: location on the host server where all the APIs are hosted (host root)
hsk/v1/hotels/{hotelId}/housekeepingOverview: API specific path relative to the host root FIG. 4 illustrates an example REST API specification 102 in accordance to one embodiment. REST API specification 102, entitled "OPERA Cloud API for HousekeepingService" provides the specification for REST APIs for acquiring housekeeping information for hotel rooms of a hotel. As disclosed, REST API specification 102 conforms to the OpenAPI Specification (formerly Swagger Specification) and is an API description format for REST APIs. An OpenAPI file such as REST API specification 102 (only partially shown in FIG. 4) allows the entire API to be described, including: (1) Available endpoints (/users) and operations on each endpoint (GET/users, POST/users); (2) Operation parameters input and output for each operation; (3) Authentication methods; and (4) Contact information, license, terms of use and other information. API specifications can be written in YAML or JSON—the example shown in FIG. 4 is JSON format. In other embodiments, other formats for REST API specification 102 can be used, such as the Blueprint format. The API specification also can include details about: (1) the Schemes (i.e., transfer protocols) being used by the API; (2) the BasePath, which is the URL prefix for all API paths relative to the host root; and (3) the Response codes supported by the API server.

For the parsing at 301, embodiments parse the YAML file (or JSON if in that format) to extract the resource URL, the parameter names along with the parameter information, the response codes and the JSON payload for POST and PUT operations. The parsed information is then provided in a spreadsheet or other readable file. FIG. 5 illustrates a partial example of a spreadsheet file 500 in accordance to one embodiment. File 500 includes a URL 501 corresponding to one of the REST APIs (there may be hundreds or thousands of REST APIs to be validated included in the full spreadsheet), and for that URL, an operation 502 (e.g., GET or PUT), and for that operation all of the parameter names 503 and a "Parameterin" 504, which indicates if the parameter is to be passed as a body parameter, header parameter or a query parameter, as defined by the business (i.e., not a user input).

File 500 further includes a "ParameterRequire" 505 that specifies whether the parameter is a mandatory parameter or an optional parameter to the API call. This is decided by the business and is pre-defined in the API specification. File 500 further includes the parameter type 506, the parameter value 507 and the parameter schema 508. Columns 507 and 508 are blank when the API specification does not include any values for those fields. For example, a "schema" would only be available for POST and PUT operations.

File 500 further includes "Response Code" 509 which are expected response codes retrieved from the API specification, and "scope" 510. Scope column 510 can be updated by the user before starting the execution if the specific API call is in the scope or not. Based on this information, embodiments would skip the API calls which are not in scope for testing.

Referring again to FIG. 3, a converter 302, provided with parameter constraints 104, parameter defaults 103 and the spreadsheet file from 301, generates a text file at 320 suitable to be fed into combination generator 107. A user who is using the tool/embodiments can send the default values or the tool can generate the values automatically based on the parameter type (i.e., String/Boolean/Integer). The default values sent in the defaults.txt file determine the values for the parameters which the tool sends to the API call during the test execution.

An example of a parameter defaults.txt file 103 is as follows, which provides default values for the authorization key (which provides authorization to use the web service) and values for identities for hotels, hotel rooms, and activities:

authorization (string): Bearer
eyJhbGciOiJSUzI1NiIsInR5cCI6IkpXVCIsIng1dCI6ImpQWIZtLXhERHFfRjgyRTRjZGpNWmMxczNzTSIsImt
pZCI6Im1zLW9hdXRoa2V5In0.eyJzdWIiOiJudmFiX3N3YXRoaSIsImlzcyI6Ind3dy5vcmFjbGUuY29tIiwib3J
hY2xlLm9hdXRoLnN2Y19wX24iOiJPQXV0aFNIcnZpY2VQcm9maWxlIiwiaWF0IjoxNjIxNzgwOTEwLCJvcm
FjbGUub2F1dGgucHJuLmlkX3R5cGUiOiJMREFQX1VJRCIsIm V4cCI6MTYyMTc4NDUxMCwib3JhY2xlLm
9hdXRoLnRrX2NvbnRleHQiOiJ1c2VyX2Fzc2VydGlvbiIsImF1ZCI6WyJodHRwczovLypvcmFjbGUuLmNvbS
IsImh0dHBzOi8vKi5pbnQiLCJodHRwczovLypvY3Mub2MtdGVzdC5jb20vll0sInBybi l6Im52YWJfc3dhdGhpi
wianRpIjoiZTQ4YzEwN2EtZjk0ZC00ZDJhLWFmMjQtYzZiYmIwYmI5YjIlIliwib3JhY2xlLm9hdXRoLm5aWV
udF9vcmluaW5faWQiOiJBWEU2OTIiNTRkNGNIYWM0MjBiYTkwZDk0YzM1NmFhY2NkMiIsInVzZXIudGV
uYW50Lm5hbWUiOiJEZWZhdWx0ORG9tYWIuliwib3JhY2xlLm9hdXRoLmlkX2RfaWQiOiIxMjM0NTY3OC0x
MjM0LTEyMzQtMTIzNC0xMjM0NTY3ODkwMTIifQ.SZcQSCby4MpPje76wUxE1qObZyYA_5NfK1uJJjm7W
TtoPtvUNq21BqmhjP52yqTBDNzs9RrHg9G6SwpKA4MIMozMg6G1-
xjFxdYVUcPf5VOufDrbC7w_r4Z74G8J90ic80MOBuTajkhKlzTUTJpcmYsrnfpZpZoGhl9X46xY0qj5UI5JMg
WedQSS57UnMIA5auFGDiz8a0Ute8qVzCDU4Wqg0WbAMIImdbT1c3QwMIPs3dDN_DNoTaLThDAbnLN2
lyRjv0ESC81tXvesBRXTUjutlCl1IGMY6o8dzMkMLxZKRQRPEGN049mH6_kYt6qlwTzHtk2sEzxP_fUHxvH
1Wg
x-hotelid: SK003
activityId: 401803
hotelId: SK003

An example of a parameter constraints file 104 is as follows, which provides dependencies between parameters:

```
completed = true => startDate = "test234"
test = true => endDate = "test234"
```

The constraints can be defined by the business which describes the dependency of one parameter to the other. For example, when a parameter such as "Completed" holds a value "true" then the parameter "EndDate" of a process cannot be anything after the currentDate. This is a condition which can be considered a constraint while defining various combinations of test data. Further, there may also be no constraints for the parameters. Therefore, even if some constraints are defined and the parameters in the constraints file are not valid for an API call then the constraints section would be empty in the text file that gets generated.

An example of the text file that is generated at 320 that includes the parameters with default values and constraints is as follows. The file shows the name of the REST API, and a listing of all parameters with possible parameter values. The default values are used against the parameters and the constraints sent by the user are not applicable to this operation, so the constraints section in the below generated text file is empty.
[System]
Name: hskv1hotels{hotelId}housekeepingOverview-get
[Parameter]
hotelId (enum): SK003
limit (integer): 75357, 33468, 45085, 57352, 31287
offset (integer): 41098, 59602, 17829, 51777, 23872
housekeepingRoomStatus (enum): hotel1, hotel2
frontOfficeRoomStatus (enum): hotel1, hotel2
turndownStatus (enum): hotel1, hotel2
roomParityStatus (enum): hotel1, hotel2
serviceRequestStatus (enum): hotel1, hotel2
roomAssignmentStatus (enum): hotel1, hotel2
fetchInstructions (enum): hotel1, hotel2
fromRoomNumber (enum): B7VIHTI, LK0WL4U, LOQU7AW, JZ0KC81, 3YFQ17U
toRoomNumber (enum): FGU6YQF, K24X0V0, ZTYIPLM, LG9IP9T, 3DQ0DJ4
floor (enum): hotel1, hotel2
roomType (enum): hotel1, hotel2
roomClass (enum): hotel1, hotel2
building (enum): hotel1, hotel2
roomFeatures (enum): hotel1, hotel2
daySection (enum): hotel1, hotel2
eveningSection (enum): hotel1, hotel2
reservationstatus (enum): hotel1, hotel2
guestServiceRequest (enum): DWFU33W, GS7PX8O, W6LJNG8, 47CA9Q4, 3PHWHC8
roomIdText (enum): TCNG6IC, 6OP4QCM, TXLVCPT, VF181VD, XS8TBD0
authorization (enum): Bearer
eyJhbGciOiJSUzI1NiIsInR5cCI6IkpXVCIsIng1dCI6ImpQWIZtLXhERHFfRjgyRTRjZGpNWmMxczNzTSIsImt
pZCI6Im1zLW9hdXRoa2V5In0.eyJzdWIiOiJudmFiX3N3YXRoaSIsImlzcyI6Ind3dy5vcmFjbGUuY29tIiwib3J
hY2xlLm9hdXRoLnN2Y19wX24iOiJPQXV0aFNIcnZpY2VQcm9maWxlIiwiaWF0IjoxNjIxMjl4NzQ2LCJvcmFj
bGUub2F1dGgucHJuLmlkX3R5cGUiOiJMREFQX1VJRCIsIm V4cCI6MTYyMTIzMjM0Niwib3JhY2xlLm9hd
XRoLnRrX2NvbnRleHQiOiJ1c2VyX2Fzc2VydGlvbiIsImF1ZCI6WyJodHRwczovLypvcmFjbGUuLmNvbVIsIl
mh0dHBzOi8vKi5pbnQiLCJodHRwczovLypvY3Mub2MtdGVzdC5jb20vll0sInBybi l6ImpliwI
anRpIjoiODM2YjQ4N2UtNThiYi00MGQwLWIzMTQtYmFINzdIODU0MGY4Iiwib3JhY2xlLm9hdXRoLm5sa
WVudF9vcmluaW5faWQiOiJBWEU2OTIiNTRkNGNIYWM0MjBiYTkwZDk0YzM1NmFhY2NkMiIsInVzZXIud
GVuYW50Lm5hbWUiOiJEZWZhdWx0ORG9tYWIuliwib3JhY2xlLm9hdXRoLmlkX2RfaWQiOiIxMjM0NTY3OC
0xMjM0LTEyMzQtMTIzNC0xMjM0NTY3ODkwMTIifQ.Wpoy_EyfKX2dTpes2EoiHTnKExta1sgblK7zrR2vccL
GldUoNPq2gTZyepKUxfh1vx2NhaVDTFeyt6ll1A1cP_0BRK17enopt2oTQU-TAfyl1rHN_vNT-
7AEZtvpsvRqzPqhdnRqgDmXKEJKGm-eKlpg-
6HXdmS5k9WVRz57_RQAGXO1kKK5rlSe7ujinXjWAf7QpnKteq1d1wOrKqVYvTjFiKw5zt4wXD3NR9Wkld
POEC9d-

```
JbHNpBKVWjTKKz6hmz5WBEGX7C_tLM5lv7KDPOMN4WAdhrPDwv6zee9H1CqxcNObiGggTc-
wjz9QpwP3VFPtxxjwPkhAhBoxpQS7Q
x_app_key (enum): SK6S2NS, 0YMPKP0, XLHR9X0, X2TDKWF, CJUUB5U
```

[Constraint]

If the user has not provided any default values, the converter searches for the existence of a system generated defaults file 310 that is generated at 305, and if that also does not exist then it uses randomly generated values that are generated at 311 based on the parameter type (e.g., String, Boolean or Integer). The system generated defaults are generated by a parser at 305 as a result of the testing, and is then used as input for the next round of testing as an iterative process. At 305, if the GET operation response is successful, then the parser retrieves the data out of the GET operation response with the key value information and stores it in a text file. This data can be used during the next execution if the user does not pass any pre-defined data values 103.

At 303, combination generation tool 107 generates a spreadsheet or other file that includes all combinations of test data for each operation (i.e., GET/POST/PUT/DE-LETE). Any available combination generation tool can be used. In one embodiment, the "Automated Combinatorial Testing for Software" tool provided by the National Institute of Standards and Technology ("NIST") is used at 303.

FIG. 6 is a partial screenshot illustrating how the initial code is executed by combination generation tool 107 and how the swagger is converted into an excel file and in turn generates test data combinations in accordance to embodiments. FIG. 6 illustrates the command that has to be executed to pull the details from the API specification document (hsk.yaml) considering the constraints.txt and the defaults.txt to generate test data text files which could be fed to the Combination generator tool.

Figure 7:
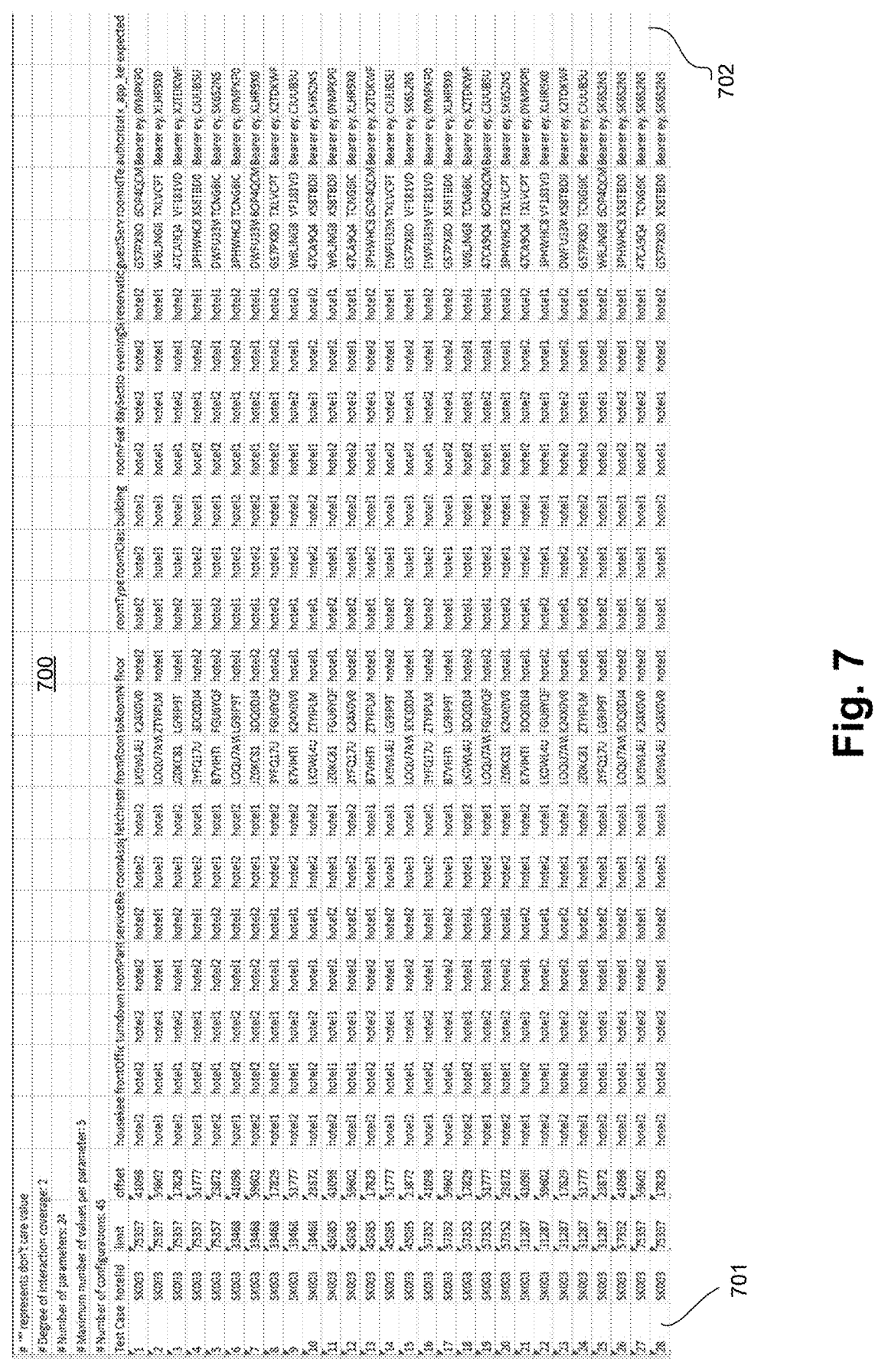

FIG. 7 is an example partial spreadsheet 700 output by the combination generator with the data combinations in accordance to embodiments. Each row on the spreadsheet of FIG. 7 is a unique combination of parameter values using different values of the test data for each test case at column 701. Spreadsheet 700 further includes an expected column 702 that can include expected values provided by the user at 330 or automatically inserted into the spreadsheet using a script macro. For example, the user in response to an API request may expect an HTTP response of "200 OK" (i.e., the standard response for a successful HTTP request). If instead, a "400 OK" is returned, this will be reported as a result of the testing.

At 304, the analyzer runs a series of tests using the spreadsheet with all data combinations (e.g., spreadsheet 700) output by the combination generator tool 107. Further inputs include user expected response codes at 330 from column 702 of spreadsheet 700 and response codes from the REST API specification at 331, which provide a set of expected responses for each request. The test operations uses the test data on the HOST that the user sends as an input. Then the execution is validated against the expected status codes passed by the user at 330 or else it validates against the response codes retrieved from the API specification file at 331. Further, the common assertions to check for error messages such as STACK Overflow and DB related information are also tested.

FIG. 8 is a partial screenshot that illustrates the analyzer executing testing and generating test reports in accordance to embodiments. FIG. 8 shows the command that has to be executed by the user of the tool to perform the validation of the API by sending the input parameters such as the API under test, the API base URL, the HTML report name, whether to check for mandatory parameters feature (testmandatory=true/false), whether to perform regression testing (regression=true/false), a large payload to perform payload check, etc.

The HTML report 110 with test execution results is then generated. FIG. 9 illustrates an example of HTML report 110 in accordance to one embodiment.

More specifically, the analysis at 304 further includes, in some embodiments, if the user requests to check for the mandatory parameters and optional parameters, then the analyzer checks if an error is displayed if any mandatory parameter is missing. It also checks by removing the optional parameters from the request to see if the request is successful. In one embodiment, the user can send the input through a command line argument (e.g., testmandatory=false) while running the tool.

FIG. 10 is a partial screenshot that illustrates how the embodiments can be run to check mandatory fields and to perform regression testing on the Application Under Test ("AUT") and generate test reports in accordance to embodiments. FIG. 10 shows the command that has to be executed by the user to perform the mandatory and the optional parameters check by passing the command line argument (testmandatory=true). This will check the API server behavior when mandatory parameters are missing and expects an error in this case. Further, when the optional parameters are missing, there should not be any difference in the API server behavior.

When the user recommends the tool to perform regression testing, the user sends the command line argument (regression=true). Once the execution is completed, the response codes are stored to the excel file for the first time. Next execution onwards, in addition to storing the response codes, embodiments also compare with the response codes of the earlier execution to check the difference in the system behavior and alerts the user if there is any difference in the response codes. The same is documented in the HTML reports that get generated at the end of the execution.

The analysis at 304 further includes, in some embodiments, extracting test data from a GET operation at 305, which is in the form of a JSON response and is then parsed to generate test data that is used for the next round of execution as the generated defaults 310. When the user sends a GET request to the API server, the response received from the server contains information related to the parameters used in the testing. Embodiments parse this response and generate a file which has the parameter name and the values that are present in the API server. These values could be used as test data (i.e., generated defaults 310) for the next round of execution in case the user does not send default values for the parameters. An example of a generated default text file is as follows:

```
type: Activity
id: 401803
```

```
hotelId: SK003
activityClass: Appointment
activityType: BROCHURE
activityTypeDescription: Brochure Requests
activityPurpose: Purpose is 386
activityOwner: ALL
startDateTime: 2020-05-26 08:45:00.0
endDateTime: 2020-05-26 09:45:00.0
completed: False
createDateTime: 2021-04-08 05:46:51.0
creatorId: VAFIRSTADMIN@VAFIRST
lastModifyDateTime: 2021-04-08 05:46:51.0
lastModifierId: VAFIRSTADMIN@VAFIRST
id: 934358
givenName: Company51400
cityName: Alma
postalCode: 80420
state: CO
code: US
phoneNumber: 9876543210
profileType: Company
primary: True
fullOverlay: False
linkedBlocks: []
linkedAttachments: []
linkedActivities: []
indicatorName: Profiles
count: 1
href: https://www.test.com/act/v1/hotels/SK003/activities/401803?fetchInstructions= ActivityInfo
rel: self
templated: False
method: GET
operations: getActivity
```

The analysis at 304 further includes, in some embodiments, checking for the idempotent feature of GET and PUT operations. Assuming the environment is controlled, embodiments check if GET and PUT operations are idempotent. The analyzer sends two consecutive GET or PUT requests to check if the same response is received in both of the cases. The input is two GET and PUT operations. The output is an HTML report with test comparison results.

Further, some API specifications do not contain information related to the schema of a POST or a PUT operation. When the tool parses the information from the API specification, the schema entry in the spreadsheet would be empty (e.g., as shown in portions of FIG. 5). In this case, the body parameter sent to the API call would be empty or the user can feed in a sample schema in the excel file generated in 301 so that the tool can pick the schema as shown at 511 of FIG. 5.

The analysis at 304 further includes, in some embodiments, validating the presence of Hypermedia as the Engine of Application State ("HATEOS") links for POST and PUT operations. HATEOAS is a constraint of the REST application architecture that distinguishes it from other network application architectures. With HATEOAS, a client interacts with a network application whose application servers provide information dynamically through hypermedia. A REST client needs little to no prior knowledge about how to interact with an application or server beyond a generic understanding of hypermedia. For a POST operation, a resource gets created along with a HATEOAS link in the response. Embodiments validate if the required HATEOAS link is returned in the response based on the API specification documentation. An API POST request is sent to the web server corresponding to the HATEOAS link and the server responds with the response. The input is an API POST request sent to the server and the server responding with the response. The output is checking for HATEOAS links.

The analysis at 304 further includes, in some embodiments, checking for the presence of HTTP security response headers. Using as input the response from an API execution, embodiments validate the presence of security response headers from the API specification such as Strict-Transport-Security, X-Frame-Options, X-XSS-Protection and X-Content-Type-Options. Can also accommodate custom headers provided by the user. The input is a response from an API execution. The output is checking the security headers in the responses.

Further, cache-control is an HTTP header used to specify browser caching policies in both client requests and server responses. Policies include how a resource is cached, where it is cached and its maximum age before expiring (i.e., time to live). In embodiments, Cache-Control is set to no-cache and no-store, meaning sensitive information is being prevented from being cached. Therefore, embodiments further validate the presence of the Cache-Control header in the received response from the server along with the other security headers such as Strict-Transport-Security, X-Frame-Options, X-XSS-Protection and X-Content-Type-Options.

Figure 11:
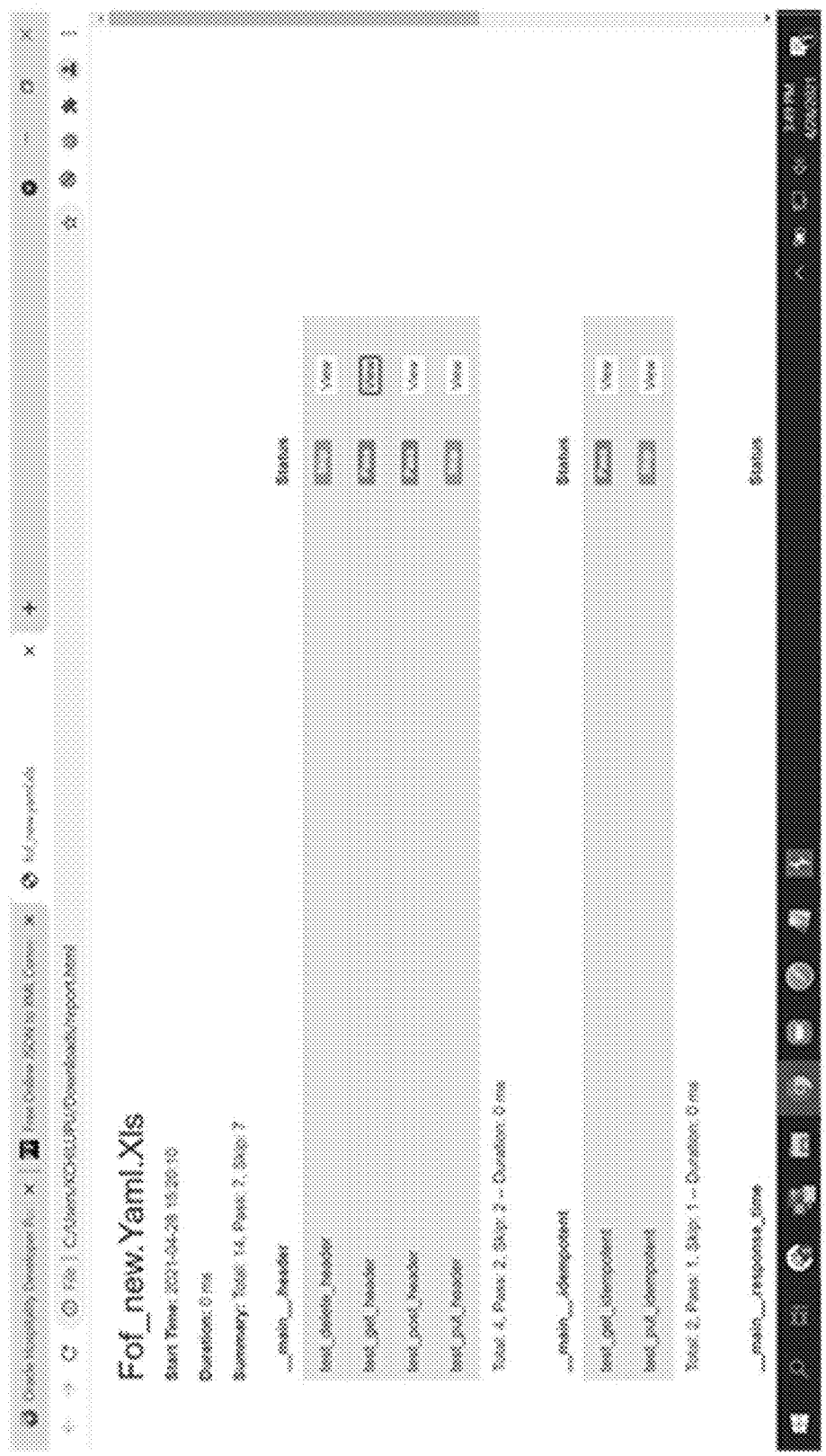
FIG. 11 is a screenshot illustrating an HTML report after checking the header related information in the responses to API requests in accordance to embodiments.

FIG. 11 is a screenshot illustrating an HTML report after checking the header related information in the responses to API requests in accordance to embodiments.

The analysis at 304 further includes, in some embodiments, comparing the results of two test executions which check the stability of the system. Embodiments compare the results of two consecutive executions, and generate an HTML report with the differences in the results. The input is an API execution. The output is an HTML report with a comparison of results.

The analysis at 304 further includes, in some embodiments, checking for incorrect paths in the URL corresponding to the API. Embodiments add an additional '/' at the end of each URL and checks if the server rejects the incorrect paths in the URL. The input is an additional '/' at the end of the URL. The output is an HTML report with execution results.

The analysis at 304 further includes, in some embodiments, checking for the large payload sent by the user. Embodiments check if the server (i.e., the server where the API implementation is hosted) rejects large payloads sent by the user and returns a valid status code. As per the REST standards, when an overly large payload is sent to the API server the request should be rejected by the server and the response code should be "413 Request Entity Too Large". The size limit can vary from product to product. The user has the flexibility to send large payloads beyond the permissible limits to check the server behavior. This helps in avoiding DoS attacks on the system under test and having an hacker send large payloads to tie up the server. The input is a large payload sent by the user. The output is an HTML report with execution results.

The analysis at 304 further includes, in some embodiments, validating the media type header sent by the user. Embodiments send different payload types and determine if the correct response is returned. Embodiments check if the server rejects an invalid media type header sent by the user and returns a valid status code. The input is an invalid media type header as part of the "Media-Type" sent by the user. The output is an HTML report with execution results.

The analysis at 304 further includes, in some embodiments, validating whether the expected compression format is satisfied by the server or not. Embodiments check if the server rejects invalid compression formats sent by the user and returns a valid status code. The input is compression type headers as part of the "Accept-Encoding" header sent by the user. The output is an HTML report with execution results.

The analysis at 304 further includes, in some embodiments, validating whether the API operation is in scope for the current testing activity or not based on the user input. Embodiments ignore the API operations which are out of scope and consider only the ones that are in scope for the testing activity. The input is the Excel file format of the API specification with the scope information updated by the user. The output is an HTML report with execution results of only the API operations that are in scope.

Embodiments skip the generation of the test data combinations approach when the parameter count in the API specification is only one. Embodiments ignore the combinatorial approach when there is only one parameter in the API specification file for a specific operation. The input is an Excel file format of the API specification with only one parameter for an API operation. The output is an HTML report with execution results Embodiments generate HTML reports for individual APIs. The HTML report 110 includes the PASS/FAIL status of the API call and in case of failure, the error code and the payload that was used in generating the failure scenario. This helps the user in regenerating the same scenario manually.

Embodiments validate for incorrect URL checks by adding an extra slash (/) at the end of the URL. Embodiments checks for the presence of HATEOS links in the response received for POST operations based on the API specification. Embodiments check for the idempotent feature of GET and PUT operations. Embodiments take into consideration the dependency between the parameters while generating the test data combinations.

Embodiments validate for the response time (i.e., the time between the instant an API is executed and the API returns the result of its computation) of an API call. Embodiments checks if the response time falls within the maximum acceptable limit (in one embodiment, 6500 ms).

Embodiments generate an Authentication token which allows the users to verify their identity. The user retains access to the API server as long as the token remains valid. The token is generated based on the credentials that the user provides during the invocation of the tool. Below is a sample file containing the information required to generate an authentication token. Embodiments also make sure that the token is regenerated before it expires (3600 ms) to keep the execution in-progress.

```
url: 'https://wfivm02186.us.oracle.com:14101/ms_oauth/oauth2/endpoints/oauthservice/tokens'
headers: {'Content-Type': 'application/x-www-form-urlencoded; charset=UTF-8', 'Authorization': 'Basic ********************'}
payload: {'username': *********, 'password': *********, 'grant_type': 'password'}
```

Embodiments further perform a verb check test. For example, assume the API specification for an API call supports both GET and POST operations only, so that other verbs such as PUT and DELETE would be considered as invalid. Embodiments attempt to send invalid operations to an API call and check whether the REST API server rejects the requests with a response code of 405.

As disclosed, embodiments solve the problem of validating REST APIs by automatically generating test inputs from the REST specification. Embodiments automate REST API quality assurance tasks.

Specifically, embodiments automatically check whether 1) the REST GET verb is idempotent; 2) HATEOAS is satisfied; 3) mandatory parameters are enforced by the implementation; and 4) the HTTP return code is consistent with the REST standard.

Further, embodiments support combinatorial testing of REST APIs. In order to apply the combinatorial testing in practice, embodiments automatically extract different parameters from the given API specification. This avoids the need to specify different parameters for combinatorial testing because embodiments automatically extract from the specification. Embodiments further include a built-in list of default values based on data types. Embodiments further parse the response JSON payload from the server and make use of the output values as inputs for future testing.

Embodiments provide an option to generate test data from the GET response. Further, embodiments generate random test data if the user does not provide any default data. Embodiments automatically validate for the response codes pulled from the API specification. Embodiments test for the HTTP headers in the response by default. Embodiments check for mandatory and optional parameters if the user requests for this check.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A method of validating representational state transfer (REST) application program interfaces (API), the method comprising:
receiving a REST API specification that provides information for a plurality of REST APIs, each REST API comprising available endpoints and available operations on each endpoint;

parsing the REST API specification to extract, for each REST API, a corresponding resource Uniform Resource Locator (URL), and corresponding parameter names for each available operation, expected response codes from each available operation and payloads from each available operation;

converting the parsed REST API specification into a converted text file, the converting using, for each available operation, corresponding parameter constraints, comprising dependencies between parameters, and parameter default values;

using a combination generator, automatically generating, from the converted text file, all possible combinations of test data for each available operation of each REST API from the converted text file and corresponding expected response codes from each combination of test data and each available operation to generate a plurality of unique test operations, each unique test operation comprising a unique combination of parameter values using different values of the test data; and executing the plurality of unique test operations on each of the combinations of test data and validating each test operation using the corresponding expected response codes.

2. The method of claim 1, further comprising:

in response to the test operations, generating, from the responses to the test operations, generated default values and repeating the converting the parsed REST API specification, generating possible combinations of test data for each available operation of each REST API and executing the plurality of unique test operations on each of the combinations of test data using the generated default values instead of the parameter default values.

3. The method of claim 1, the test operations comprising, for each REST API, at least one of: checking incorrect paths in the URL; checking for a rejection of an overly large payload; or validating rejections of invalid media type headers.

4. The method of claim 1, the test operations comprising, for each REST API, at least one of: validating an expected compression format; checking for missing mandatory parameters; or regression testing.

5. The method of claim 1, the test operations comprising, for each REST API, at least one of: checking whether GET and PUT operations are idempotent; or validating a presence of Hypermedia as the Engine of Application State (HATEOS) links for POST and PUT operations.

6. The method of claim 1, wherein the possible combinations of test data comprises test data for operations comprising GET, POST, PUT and DELETE.

7. The method of claim 1, wherein the REST API specification comprises a Swagger format and comprises a JavaScript Object Notation (JSON) format or a YAML format.

8. The method of claim 1, wherein the generating possible combinations comprises generating a spreadsheet of all possible combinations.

9. A representational state transfer (REST) application program interfaces (API) validation system comprising:

a first parser, implemented by one or more processors, that is configured to receive a REST API specification that provides information for a plurality of REST APIs and parses the REST API specification to extract, for each REST API, each REST API comprising available endpoints and available operations on each endpoint, a corresponding resource Uniform Resource Locator (URL), and corresponding parameter names for each available operation, expected response codes from each available operation and payloads from each available operation;

a converter, implemented by the one or more processors, that is configured to convert the parsed REST API specification into a converted text file, the converting using, for each available operation, corresponding parameter constraints, comprising dependencies between parameters, and parameter default values;

a combination generator that is configured to automatically generate, from the converted text file, all possible combinations of test data for each available operation of each REST API from the converted text file and corresponding expected response codes from each combination of test data and each available operation to generate a plurality of unique test operations, each unique test operation comprising a unique combination of parameter values using different values of the test data; and an analyzer configured to execute the plurality of unique test operations on each of the combinations of test data and validate each test operation using the corresponding expected response codes.

10. The system of claim 9, further comprising:

in response to the test operations, a second parser configured to generate, from the responses to the test operations, generated default values, the system repeating the converting the parsed REST API specification, generating possible combinations of test data for each available operation of each REST API and executing the plurality of unique test operations on each of the combinations of test data using the generated default values instead of the parameter default values.

11. The system of claim 9, the test operations comprising, for each REST API, at least one of: checking incorrect paths in the URL; checking for a rejection of an overly large payload; or validating rejections of invalid media type headers.

12. The system of claim 9, the test operations comprising, for each REST API, at least one of: validating an expected compression format; checking for missing mandatory parameters; or regression testing.

13. The system of claim 9, the test operations comprising, for each REST API, at least one of: checking whether GET and PUT operations are idempotent; or validating a presence of Hypermedia as the Engine of Application State (HATEOS) links for POST and PUT operations.

14. The system of claim 9, wherein the possible combinations of test data comprises test data for operations comprising GET, POST, PUT and DELETE.

15. The system of claim 9, wherein the REST API specification comprises a Swagger format and comprises a JavaScript Object Notation (JSON) format or a YAML format.

16. The system of claim 9, wherein the generating possible combinations comprises generating a spreadsheet of all possible combinations.

17. A non-transitory computer-readable medium storing instructions which, when executed by at least one of a plurality of processors, cause the processors to validate representational state transfer (REST) application program interfaces (API), the validating comprising:

receiving a REST API specification that provides information for a plurality of REST APIs, each REST API comprising available endpoints and available operations on each endpoint;

parsing the REST API specification to extract, for each REST API, a corresponding resource Uniform Resource Locator (URL), and corresponding parameter names for each available operation, expected response codes from each available operation and payloads from each available operation;

converting the parsed REST API specification into a converted text file, the converting using, for each available operation, corresponding parameter constraints, comprising dependencies between parameters, and parameter default values;

using a combination generator, automatically generating, from the converted text file, all possible combinations of test data for each available operation of each REST API from the converted text file and corresponding expected response codes from each combination of test data and each available operation to generate a plurality of unique test operations, each unique test operation comprising a unique combination of parameter values using different values of the test data; and executing the plurality of unique test operations on each of the combinations of test data and validating each test operation using the corresponding expected response codes.

18. The computer-readable medium of claim 17, the validating further comprising:

in response to the test operations, generating, from the responses to the test operations, generated default values and repeating the converting the parsed REST API specification, generating possible combinations of test data for each available operation of each REST API and executing the plurality of unique test operations on each of the combinations of test data using the generated default values instead of the parameter default values.

19. The computer-readable medium of claim 17, the test operations comprising, for each REST API, at least one of: checking incorrect paths in the URL; checking for a rejection of an overly large payload; or validating rejections of invalid media type headers.

20. The computer-readable medium of claim 17, the test operations comprising, for each REST API, at least one of: validating an expected compression format; checking for missing mandatory parameters; or regression testing.

\* \* \* \* \*